UNITED STATES PATENT OFFICE.

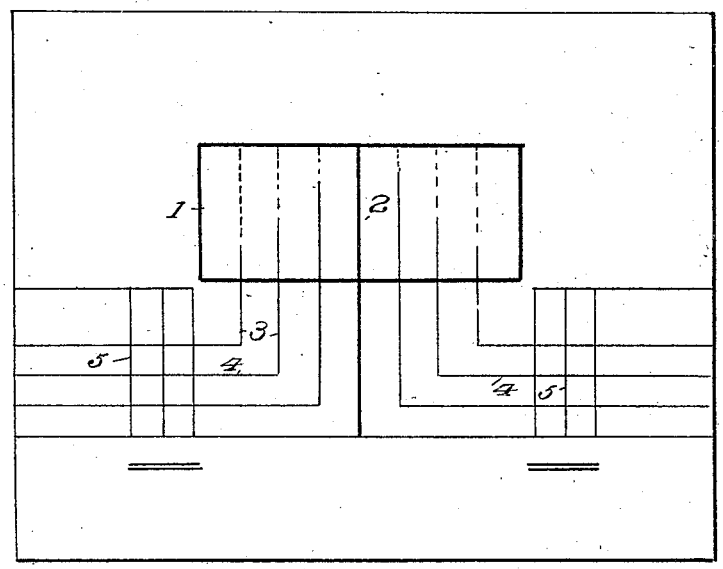

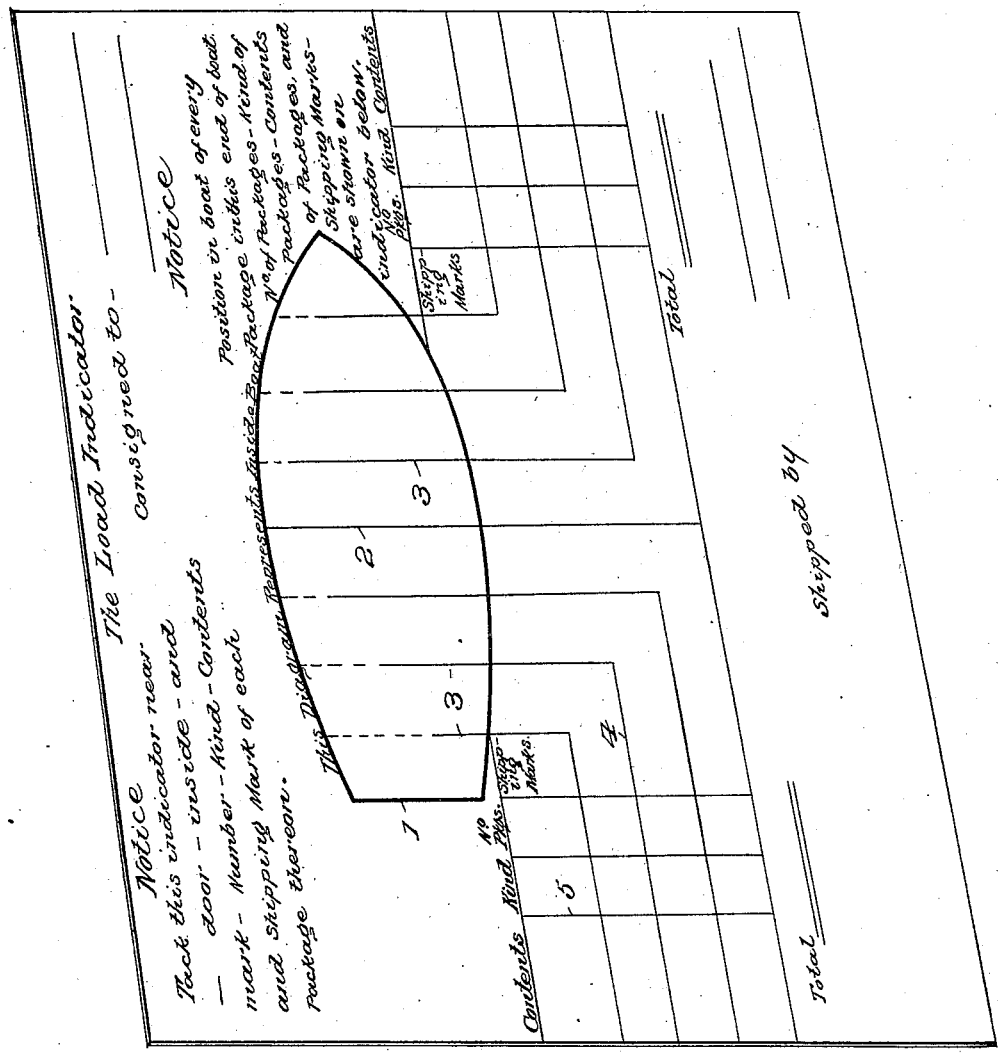

MACK C. COATS, OF MARYSVILLE, CALIFORNIA.

LOAD-INDICATOR FOR RAILWAY-CARS.

No. 880,719.  Specification of Letters Patent.  Patented March 3, 1908.

Application filed March 7, 1907. Serial No. 361,167.

*To all whom it may concern:*

Be it known that I, MACK C. COATS, citizen of the United States, residing at Marysville, in the county of Yuba and State of California, have invented certain new and useful Improvements in Load-Indicators for Railway-Cars, of which the following is a specification.

The object of my invention is to provide means whereby the consignor and consignee of a car load of goods, or the freight agents may determine at once, without overhauling the goods, the exact location of the different consignments in the car, as well as the character of such consignments, the number of packages and the like, and while I have described my invention particularly in connection with a freight car, it is to be understood that my improved diagram or load indicator may be of any shape or size so as to represent not only the form of the car, but a boat, store room, ware-house, case, box, crate, barrel, or anything in which are placed goods, wares, merchandise, or other commodities for the purpose of transportation or storage.

With these and other objects in view as will more fully appear as the description proceeds, the invention consists in a load indicator embodying a novel and useful diagram, as will be hereinafter fully described and claimed.

For a full understanding of the invention and the merits thereof and also to acquire a knowledge of the details of construction of the means for effecting the result, reference is to be had to the following description and accompanying drawings, in which:

Figure 1 illustrates one embodiment of the diagram proper, ready for use and shows the indicator as applicable particularly to a freight car or ware-house, or receptacle of rectangular and oblong shape; Fig. 2 represents an instance in which the indicator has been filled out, and, Fig. 3 is a perspective view of another embodiment of the invention, illustrating it as applicable to a vessel.

Corresponding and like parts are referred to in the following description and indicated in all the views of the drawings by the same reference characters.

As stated at the outset of my specification, my improved load indicator embodies a blank containing a diagram which represents the inside of a car or ware-house, or the like, in which goods are to be placed. In the present instance, as stated, the diagram 1 illustrates the interior of a freight car, and the indicator is a piece of cardboard, paper, wood, cloth, metal or other material upon which the said diagram 1 may be drawn, carved, engraved, or otherwise placed. The diagram 1 is rectangular and oblong as shown, and is preferably divided by a line 2 into two equal compartments, representing the two end portions of the car. On each side of this main division line 2 are a series of leader lines 3 which may be of any number and of any curvature or angle and which commence at different points within the diagram 1 at different distances from one side of said diagram, and the said lines 3 extend outwardly from the diagram and thence either curve or extend laterally at angles to the main portion to form tabulating lines extending parallel to each other, as indicated at 4. These tabulating lines 4 are intersected by vertical lines 5 so that the columns thereby produced may be filled in with any desired amount or character of data. The lines 3 point to and terminate at those points in the diagram which correspond to those points within the car itself where the goods are placed, designated by the descriptive matter on the laterally extending tabulating lines 4.

For a more complete understanding of the invention, an instance of its use is herein given, illustrated in Fig. 2. It will be seen that the card upon which the diagram is placed contains at one corner, the words "Notice" and "Tack this indicator near car door, inside, and mark, number, kind, contents and shipping mark of each package thereon." Above the diagram are the words "This car is consigned to", together with a blank space in which the consignee's name and address are to be filled in. At one, or both ends of the diagram the following notice occurs: "Notice"—"Position in car of every package in this end of the car"—"Number of packages"—"Kinds of packages"—"Contents of packages"—and, "Shipping marks are shown on indicator below." The account columns from which the lines 3 extend as leaders or pointers are headed, respectively, by the words: "Contents"—"Kind"—"Number of packages" and—"Shipping marks", together with the word "Total" at the bottom, and below the diagram and indicators are the words "Shipped by", together with lines to be filled in by the name and address of the consignor. For instance, it will be seen that the present load indicator, which is used as an example only, is used by "John Roe Co." to ship a quantity of mill stuffs to "John Doe." One of the indicators, it will be noted is filled in with "yellow corn meal, 25 lb. sacks"; "400" and "J. D's. sks", the latter indicating the shipping marks. As soon as the car is received by the consignee and the car opened, the indicator will at once show to the consignee or his agent, that at the point within the car where the leader 3 of said filled-in line terminates will be found the goods described on said line. This is only given as an example, and it is believed that it is sufficient to show the purpose and workings of the invention.

From the foregoing description in connection with the accompanying drawing, it will be seen that I have provided an improved load indicator, which will show at a glance in what part of a car or like receptacle each article therein is placed, as well as the shipping marks and the number of packages and kinds, and contents of packages.

With one of these indicators tacked or otherwise secured in a car and properly filled out, a complete record of the car will be given, both for the loader and the unloader. It is to be understood that I am not limited to any form of indicator or any arrangement thereof in so far as the indicators are provided with lines running through into the diagram and terminating at those points in the diagram which correspond to the points of the car or the like where the goods, described in the indicators are to be found.

It is also obvious that by tacking the indicator on the inside of a car, and as each end of the car is loaded, by writing upon the end of the indicator pointing to that end of the car the contents, it matters not how many times the car is turned end for end, the indicator will show where each and every lot of goods is in the car.

As above stated, it is to be understood that my invention is not limited merely to use with a freight car or ware-house. For instance, as indicated in Fig. 3, the diagram 1 on the card-board or the like, may be of the conventional shape of the hold or hull of a marine vessel, and the lines 2, 3, 4 and 5 correspond in this modification to the light lines in the other embodiments of the invention.

Having thus described the invention, what is claimed as new is:

As a new article of manufacture, the herein described load indicating card provided with a diagram of the shape and proportion of the parts of the interior of a space where goods are located, a set of leader lines terminating at one end at different points within said diagram and extending outwardly therefrom, a series of horizontal lines outside of said diagram, said horizontal lines extending parallel to each other and connected at one end with the outer ends of the respective leader lines, and a series of vertical lines intersecting the said horizontal lines and forming therewith tabulating columns, as and for the purpose set forth.

In testimony whereof I affix my signature in presence of two witnesses.

MACK C. COATS.

Witnesses:
 WALLACE DINSMORE,
 C. T. AARON.